United States Patent [19]

Satter et al.

[11] Patent Number: 5,770,247
[45] Date of Patent: Jun. 23, 1998

[54] METHOD OF INCREASING THE CLA CONTENT OF COW'S MILK

[75] Inventors: Larry D. Satter; Tilak R. Dhiman; Michael W. Pariza, all of Madison, Wis.

[73] Assignee: Wisconsin Alumni Research Foundation, Madison, Wis.

[21] Appl. No.: 725,389

[22] Filed: Oct. 3, 1996

[51] Int. Cl.[6] .................................................. A23K 1/16
[52] U.S. Cl. .............................. 426/2; 424/438; 426/623; 426/630; 426/635
[58] Field of Search .................................. 426/580, 623, 426/630, 635, 2; 424/438

[56] References Cited

U.S. PATENT DOCUMENTS

| | | | |
|---|---|---|---|
| 4,073,960 | 2/1978 | Scott | 426/2 |
| 5,236,717 | 8/1993 | Vinci | 426/2 |
| 5,416,114 | 5/1995 | Yehuda | 426/2 |
| 5,416,115 | 5/1995 | Erdman et al. | 514/560 |
| 5,425,963 | 6/1995 | Lajoie | 426/2 |
| 5,532,008 | 7/1996 | Sasaoka | 426/2 |
| 5,547,686 | 8/1996 | Jenkins | 426/2 |

OTHER PUBLICATIONS

Pariza, Michael W., Bulletin of the IDF (1991) p.29. CLA, A New Cancer Inhibitor in Dairy Products.
T.R. Dhiman et al, Abstract, 87th AOCS Annual Meeting 28 Apr., 1996, pp. 29, 30. Dietary Effects on Conjugated Linoleic Acid Content in Cows Milk.
Jiang, Jin et al., Journal of Dairy Science (1996) No. 79, pp. 438–445. Occcurence of Conjugated Cis–9, Trans–11–Octadecdienoic Acid in Bovine Milk: Effects of Feed and Dietary Regimen.
Banks 1980 J. Sci Food Agric 31:368–374.
Wu 1994 J Dairy Sci 77:1644–1651.
Kepler 1967 J. Biological Chemistry 242 (24)5686–5692.
Kepler 1971 J. Biological Chemistry 246 (9)2765–2771.
Palmquist 1991 Lipids 26(9)718–722.

*Primary Examiner*—Carolyn Paden
*Attorney, Agent, or Firm*—Quarles & Brady

[57] ABSTRACT

A method of increasing the conjugated linoleic acid (CLA) content of milk consists of feeding to a lactating cow a diet which contains about 1% to about 5% of a vegetable oil containing linoleic or linolenic acid. Feed for use in the method and milk containing increased levels of CLA are also disclosed.

5 Claims, No Drawings

METHOD OF INCREASING THE CLA CONTENT OF COW'S MILK

FEDERALLY SPONSORED RESEARCH

This invention was made with United States government support awarded by USDA, Grant No. 58-3655-3-104. The United States Government has certain rights in this invention.

CROSS REFERENCE TO RELATED APPLICATION

Not Applicable

FIELD OF THE INVENTION

The present invention relates generally to feeding of cows. More particularly, it relates to a method of feeding a lactating cow so that its milk has an increased concentration of conjugated linoleic acid (CLA).

BACKGROUND OF THE INVENTION

Conjugated linoleic acid (CLA) is a collective term for positional and geometric isomers of linoleic acid. While linoleic acid has double bonds between the 9th and 10th carbons and the 12th and 13th carbons, CLA has conjugated double bonds at carbon atoms 10 and 12 or 9 and 11 with possible cis and trans combinations. (e.g. c-9, t-11; t-10, c-12; t-9, t-11; and, t-10, t-12-octadecadienoic acids).

It has recently been discovered that conjugated linoleic acid (CLA) possesses beneficial effects for humans. For example, CLA is known to help reduce body fat and to enhance or maintain protein levels in humans. It is also known to prevent the weight loss that is associated with immune stimulation. In addition, there is research that suggests that it may be useful for other purposes.

Cow's milk normally contains about 0.3 to about 0.6% CLA as a percent of total fatty acids (i.e. about 3.0 mg/g of fatty acids to about 6.0 mg/g of fatty acids). The amounts of CLA that are required to obtain a reduction of body fat and other benefits in humans are significantly higher (3 to 6 times) than the amounts which can be obtained by consuming reasonable amounts of cowls milk. In other words, cow's milk, while a good source of CLA for a human's diet, does not contain enough CLA to provide for a reduction of body fat and other benefits.

It is known that the CLA content in cow's milk can be increased by feeding a lactating cow solely on grass. However, it is not economically practical in the United States to feed dairy cattle strictly on grass.

It would be advantageous to have a method of increasing the CLA content in cow's milk.

BRIEF SUMMARY OF THE INVENTION

It is the object of the present invention to disclose a method of increasing the CLA content of cow's milk by feeding a special diet to a lactating cow.

Further objects are to disclose milk containing high levels of CLA and to disclose a feed for lactating cows which can be used in the method of the present invention.

We have discovered that the CLA content in a lactating cow's milk can be significantly increased if the cow is fed for at least about 7 days a diet which includes about 1% to about 5% by weight of a vegetable oil which contains about 30% or more of linoleic acid or about 30% or more of linolenic acid or a mixture thereof. The oil may be added to the diet as the oil itself or as disrupted oil seeds.

The vegetable oils that we have found to be especially useful in the method of the present invention are soybean oil and linseed oil, but other vegetable oils, such as sunflower oil, canola oil, corn oil, peanut oil, rapeseed oil, and sunflower oil, also may be used.

The milk which is obtained by the method of the present invention is novel in that it contains much higher levels of CLA than have been previously obtained.

The novel feed of the present invention is a conventional feed for a lactating cow which contains about 1 to about 5% by weight of a suitable vegetable oil. The feed can be modified by adding the free oil Der se to the conventional feed or by adding to the feed an amount of oil seeds which have been disrupted by extrusion or an equivalent process, so that they contain the desired amount of the free oil.

An important advantage of the method of the present invention is that it makes it possible for milk having a high content of CLA to be provided year around.

The object of the present invention and other objects and advantages apparent to those skilled in the art will become apparent from the description which follows.

PREFERRED EMBODIMENTS OF THE INVENTION

In a preferred embodiment of the method of the present invention, a lactating cow is fed a diet which contains about 1 to about 5% by weight of vegetable oil, such as soybean oil or linseed oil or mixture thereof.

The preferred diet is a mixture of 50%–60% forage and 40%–50% grain to which has been added about 1% to about 5% by weight of total diet dry matter of soybean oil, linseed oil, or other suitable vegetable oil or mixtures thereof.

The novel cow's milk obtained by the practice of the method of the present invention has a concentration of conjugated linoleic acid (CLA) of about 7 mg to about 40 mg per gram of the total fatty acids in the milk. Our discovery that the CLA content of milk from a lactating cow can be increased by feeding the cow a diet containing free soybean oil or free linseed oil was unexpected because lactating cows fed intact seed containing the same amount of oil, gave milk which was only slightly higher in CLA content than normal or control milk.

The practice of the present invention is further illustrated by the example which follows.

EXAMPLE 1

An experiment involving 6 groups of 6 lactating cows each was conducted to show the effects of diet on the CLA content of milk. Table 1 describes the six treatment diets. Diet 1 was the control diet, with no added oil source. Diet 2 contained unheated, cracked soybeans. Diet 3 was the same as Diet 2, except roasted soybeans were used. Diet 4 contained 3.6% soybean oil, approximately equivalent to the oil contained in the soybeans in diets 2 and 3. Diets 5 and 6 contained 2.2 and 4.4% added linseed oil, respectively. Milk was collected from all cows and processed in an identical manner. After two weeks, the milk obtained from the cows fed the diet containing the free soybean oil contained 17.63 mg of CLA per gram of fatty acids and the milk from the cows fed the diets with linseed oil contained 12.86 and 12.83 mg of CLA per gram of fatty acids. The milk collected and processed from cows fed similar diets containing about the same amount of oil in intact seeds either did not change or increased slightly. The CLA values of the milk obtained from cows receiving the six treatment diets is shown in Table 2.

TABLE 1

Ingredient compositions of experimental diets.

| Ingredient | 1* | 2 | 3 | 4 | 5 | 6 |
|---|---|---|---|---|---|---|
| Alfalfa silage | 34.0 | 34.0 | 34.0 | 34.0 | 34.0 | 34.0 |
| Corn silage | 17.0 | 17.0 | 17.0 | 17.0 | 17.0 | 17.0 |
| High moisture ear corn | 31.9 | 27.2 | 27.2 | 27.5 | 29.2 | 26.5 |
| Soybean meal | 15.5 | 2.2 | 2.2 | 16.3 | 16.0 | 16.5 |
| Raw cracked soybeans | — | 18.0 | — | — | — | — |
| Roasted cracked soybeans | — | — | 18.0 | — | — | — |
| Soybean oil | — | — | — | 3.6 | — | — |
| Linseed oil | — | — | — | — | 2.2 | 4.4 |
| Dicalcium phosphate | .35 | .35 | .35 | .35 | .35 | .35 |
| Lime stone | .7 | .7 | .7 | .7 | .7 | .7 |
| Mg oxide | .05 | .05 | .05 | .05 | .05 | .05 |
| Trace-Mineralized salt | .5 | .5 | .5 | .5 | .5 | .5 |
| Vitamin A, D, and E | trace | trace | trace | trace | trace | trace |

*Was also used as a pretrial diet.
Treatment 1 = No supplement (Control)
Treatment 2 = Raw cracked soybeans
Treatment 3 = Roasted cracked soybeans
Treatment 4 = Soybean oil (3.6%)
Treatment 5 = Linseed oil (2.2%)
Treatment 6 = Linseed oil (4.4%)

TABLE 2

Content of CLA as a percent of total fatty acids in milk.

| | COW | Trt | PT | Avg | Std Deviation | Wk2 | Avg | Deviation | |
|---|---|---|---|---|---|---|---|---|---|
| 1 | 3267 | 1 | 0.32 | 0.314 | 0.033 | 0.31 | 0.327 | 0.034 | No Supplement (Control) |
| 2 | 3273 | 1 | 0.33 | | | 0.40 | | | |
| 3 | 3274 | 1 | 0.31 | | | 0.30 | | | |
| 4 | 3279 | 1 | 0.27 | | | 0.29 | | | |
| 5 | 3295 | 1 | 0.37 | | | 0.34 | | | |
| 6 | 3415 | 1 | 0.28 | | | 0.32 | | | |
| 7 | 3271 | 2 | 0.31 | 0.343 | 0.052 | 0.30 | 0.32 | 0.035 | Raw cracked soybeans |
| 8 | 3275 | 2 | 0.39 | | | 0.31 | | | |
| 9 | 3284 | 2 | 0.33 | | | 0.27 | | | |
| 10 | 3401 | 2 | 0.43 | | | 0.32 | | | |
| 11 | 3414 | 2 | 0.33 | | | 0.35 | | | |
| 12 | 3422 | 2 | 0.27 | | | 0.37 | | | |
| 13 | 3242 | 3 | 0.40 | 0.334 | 0.036 | 0.61 | 0.713 | 0.163 | Roasted cracked soybeans |
| 14 | 3248 | 3 | 0.30 | | | 0.60 | | | |
| 15 | 3264 | 3 | 0.31 | | | 0.98 | | | |
| 16 | 3270 | 3 | 0.30 | | | 0.90 | | | |
| 17 | 3272 | 3 | 0.34 | | | 0.62 | | | |
| 18 | 3409 | 3 | 0.36 | | | 0.57 | | | |

TABLE 2-continued

Content of CLA as a percent of total fatty acids in milk.

| COW | | Trt | PT | Avg | Std Deviation | Wk2 | Avg | Deviation | |
|---|---|---|---|---|---|---|---|---|---|
| 19 | 3239 | 4 | 0.57 | 0.387 | 0.094 | 0.90 | 1.763 | 0.465 | ⎤ |
| 20 | 3260 | 4 | 0.41 | | | 2.20 | | | |
| 21 | 3297 | 4 | 0.34 | | | 2.29 | | | ⎬ Soybean oil |
| 22 | 3298 | 4 | 0.29 | | | 1.50 | | | (3.6%) |
| 23 | 3404 | 4 | 0.42 | | | 1.87 | | | |
| 24 | 3433 | 4 | 0.30 | | | 1.81 | | | ⎦ |
| 25 | 3231 | 5 | 0.33 | 0.325 | 0.05 | 1.56 | 1.286 | 0.428 | ⎤ |
| 26 | 3247 | 5 | 0.23 | | | 1.47 | | | |
| 27 | 3277 | 5 | 0.39 | | | 0.81 | | | ⎬ Linseed oil |
| 28 | 3285 | 5 | 0.31 | | | 0.58 | | | (2.2%) |
| 29 | 3296 | 5 | 0.36 | | | 1.69 | | | |
| 30 | 3410 | 5 | 0.33 | | | 1.60 | | | ⎦ |
| 31 | 3244 | 6 | 0.51 | 0.397 | 0.067 | 1.19 | 1.283 | 0.311 | ⎤ |
| 32 | 3261 | 6 | 0.35 | | | 1.92 | | | |
| 33 | 3266 | 6 | 0.38 | | | 1.23 | | | ⎬ Linseed oil |
| 34 | 3287 | 6 | 0.30 | | | 1.19 | | | (4.4%) |
| 35 | 3429 | 6 | 0.42 | | | 0.89 | | | |
| 36 | 3442 | 6 | 0.43 | | | 1.28 | | | ⎦ |

This column represents CLA values after two weeks on control diet.

This column represents CLA values after two weeks of supplementation.

The CLA obtained by the practice of the method of the present invention contains one or more of 9,11-octadecadienoic acids and/or 10,12-octadecadienoic acids and active isomers thereof. It is normally bound through ester linkages.

Theoretically, 8 possible geometric isomers of 9,11- and 10,12-octadecadienoic acid (c9,c11; c9,t11; t9,c11; t9,t11; c10,c12; c10,t12; t10,c12 and t10,t12) would form from the isomerization of c9,c12-octadecadienoic acid. As a result of the isomerization, only four isomers (c9,c11; c9,t11; t10,c12; and c10,c12) would be expected. However, of the four isomers, c9,t11- and t10,c12-isomers are predominantly produced during the autoxidation or alkali-isomerization of c9,c12-linoleic acid due to the co-planar characteristics of 5 carbon atoms around a conjugated double-bond and spatial conflict of the resonance radical. The remaining two c,c-isomers are minor contributors.

The relatively higher distribution of the t,t-isomers of 9,11- or 10,12-octadecadienoic acid apparently results from the further stabilization of c9,t11- or t10,c12-geometric isomers, which is thermodynamically preferred, during an extended processing time or long aging period. Additionally the t,t-isomer of 9,11- or 10,12-octadecadienoic acid that was predominantly formed during the isomerization of linoleic acid geometrical isomers (t9,t12-, c9,t12- and t9,c12-octadecadienoic acid) may influence the final ratio of the isomers or the final CLA content in the samples.

Linoleic acid geometrical isomers also influence the distribution of minor contributors (c,c-isomers of 9,11- and 10,12-, t9,c11- and c11,t12-octadecadienoic acids). The 11,13-isomer might be produced as a minor product from c9,c12-octadecadienoic acid or from its isomeric forms during processing.

It will be apparent from the above to those skilled in the art that we have discovered a simple, inexpensive method of significantly increasing the CLA content of the milk of lactating cows, novel feed formulae for use in the method and a novel cow's milk containing a much higher CLA content than prior art milk.

It also would be apparent to those skilled in the art that a number of changes and modifications can be made without departing from the spirit and scope of the present invention. Therefore it is intended that the invention only be limited by the claims.

We claim:

1. A method of increasing the conjugated linoleic acid (CLA) content in a cow's milk, said method comprising feeding to a lactating cow for about 7 days a feed to which has been added about 1% to about 5% by weight of a vegetable oil which contains at least 30% linoleic acid or 30% linolenic acid, and then collecting the milk.

2. A method of claim 1 in which the vegetable oil is added to the feed in the form of the free oil.

3. A method of claim 1 in which the vegetable oil is added to the feed in the form of disrupted oil seeds.

4. A method of claim 1 in which the vegetable oil is soybean oil.

5. A method of claim 1 in which the vegetable oil is linseed oil.

* * * * *